INVENTOR.
Jaime Colon Grau
BY Michael S. Striker
Attorney

Nov. 10, 1959 J. C. GRAU 2,912,048
BLIND ARRANGEMENT
Filed May 20, 1957 3 Sheets-Sheet 2

INVENTOR
Jaime Colom Grau
BY
Michael S. Striker
Attorney

Nov. 10, 1959 J. C. GRAU 2,912,048
BLIND ARRANGEMENT
Filed May 20, 1957 3 Sheets-Sheet 3

INVENTOR.
Jaime Colom Grau
BY Michael S. Striker
Attorney

United States Patent Office 2,912,048
Patented Nov. 10, 1959

2,912,048
BLIND ARRANGEMENT
Jaime Colom Grau, Tarrasa, Spain
Application May 20, 1957, Serial No. 660,346
Claims priority, application France September 1, 1953
7 Claims. (Cl. 160—133)

The present invention relates to a blind arrangement, and is a continuation-in-part of my prior application Ser. No. 453,358, filed August 31, 1954, now abandoned.

More particularly, the present invention relates to a combined roller and Venetian blind which includes a number of slats which may either lie flat and form a continuous or discontinuous sheet or which may be inclined so as to permit the passage of light and air.

There exist roller type blinds which comprise a series of slats which at all times form a more or less flat sheet. The slats are interconnected in such a manner that the blind may be rolled upon a suitable roller, and also in such a manner that the slats may either be contiguous with each other so as to form a continuous sheet which affords a tight closure impervious to rain, wind or light, or be spaced from each other so as to permit the passage of light and air. Such arrangements, however, lack the inherent advantage of Venetian blinds in which the individual slats can be tilted to any desired angle so as to control the amount of air and light passing through the blind. A Venetian blind, in turn, cannot provide a rain or wind-proof closure.

It is therefore an object of the present invention to overcome the above disadvantages by providing a blind arrangement which possesses the advantages of both a roller blind and a Venetian blind, i.e., a blind which is capable of providing a weather-proof closure while having at least some slats which may be tilted so as to admit large quantities of light and air.

The objects of the present invention also include the provision of a blind arrangement which maybe constructed and installed at very lower cost.

The objects of the present invention further include the provision of a blind which will give long periods of trouble-free service.

With the above objects in view, the present invention mainly consists in a blind arrangement which comprises a series of parallel slats adapted to cooperate with each other in such a manner as to form a sheet. Means are provided which connect the series of slats for movement with each other, for movement relative to each other between a closed position wherein the slats are contiguous to each other and form a substantially continuous sheet and an extended position wherein the slats are spaced from each other and form a discontinuous sheet, and for mounting each of at least a plurality of consecutive slats for pivotal movement about a transverse axis between a flat position wherein each of the plurality of consecutive slats lies in the plane of the sheet and a tilted position wherein each of the plurality of consecutive slats forms an angle with this plane. Additional means are operatively associated with the slats for alternatively, whenever desired, (a) causing the series of slats to occupy the closed position, (b) causing the series of slots of occupy the open position, and (c) causing the plurality of tiltable slats to occupy the tilted position.

According to one embodiment of the present invention guide means are provided for guiding the series of connected slats for movement in a frame, and positioning means are operatively associated with the guide means and are adapted to cooperate with the plurality of consecutive slats for alternatively, whenever desired, (a) permitting the same to occupy their flat position during movement of the plurality of consecutive slats past the positioning means and (b) causing the plurality of consecutive slats to be moved into their tilted position during movement of the plurality of consecutive slats past the positioning means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
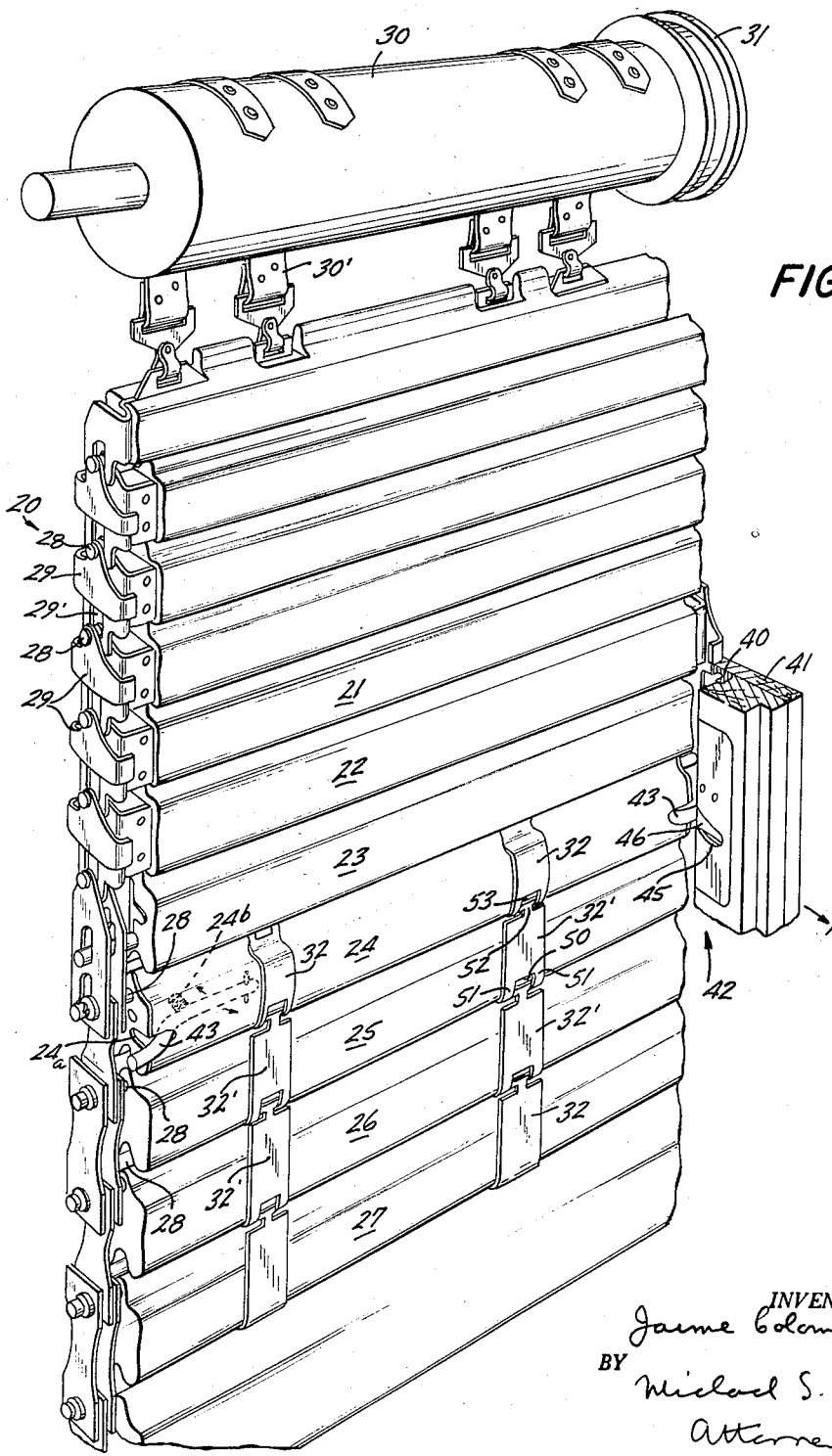
Fig. 1 is a perspective view, partly in section, of a blind arrangement according to the present invention.
Figure 2:
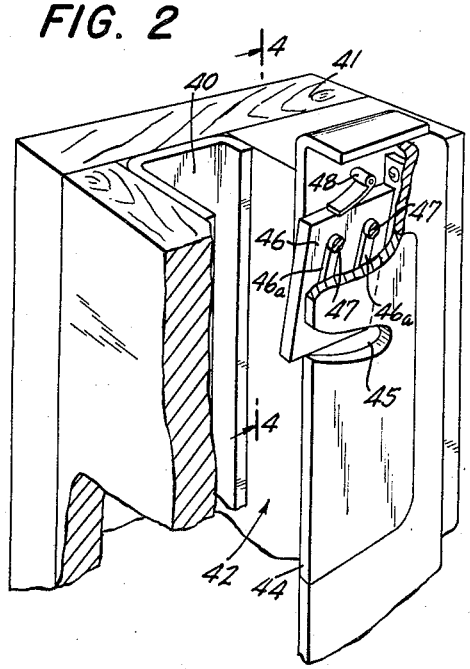
Fig. 2 is a fragmentary perspective view, partly in section, of a detail.
Figure 3:
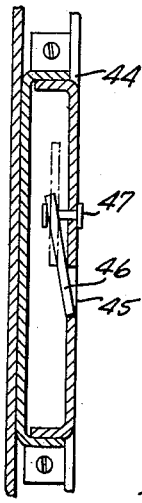
Fig. 3 is an end view of a detail, as seen in the direction of the arrow A in Fig. 1.

Referring now to the drawings, and to Figs. 1 to 7 thereof in particular, there is shown a blind indicated generally at 20 which is composed of a series of parallel slats, seven of which are illustrated and indicated at 21, 22, 23, 24, 25, 26, and 27, respectively. Each of the slats carries at its opposite ends a pin 28, and the pins which are on the same side of the slats are connected by a chain 29 the individual links of which are constructed in any well known manner that the blind 20 may be rolled upon a drum 30. The latter may be rotated by a drive wheel 31 which, in turn, may be turned in any suitable manner. Thus, the drive wheel may be in the form of a drum upon which a pull cord is wound. As shown in Fig. 1 each link of the chain is pivotally connected at one end thereof to one end of a pin 28 and is formed at the other end thereof with a slot 29' through which the pin 28 of the following slat protrudes and the uppermost slat of the blind is connected by flexible straps 30' to the drum 30, so that upon turning of drum 30 the blind 20 will be rolled up on the drum.

Figures 5, 6, 7:
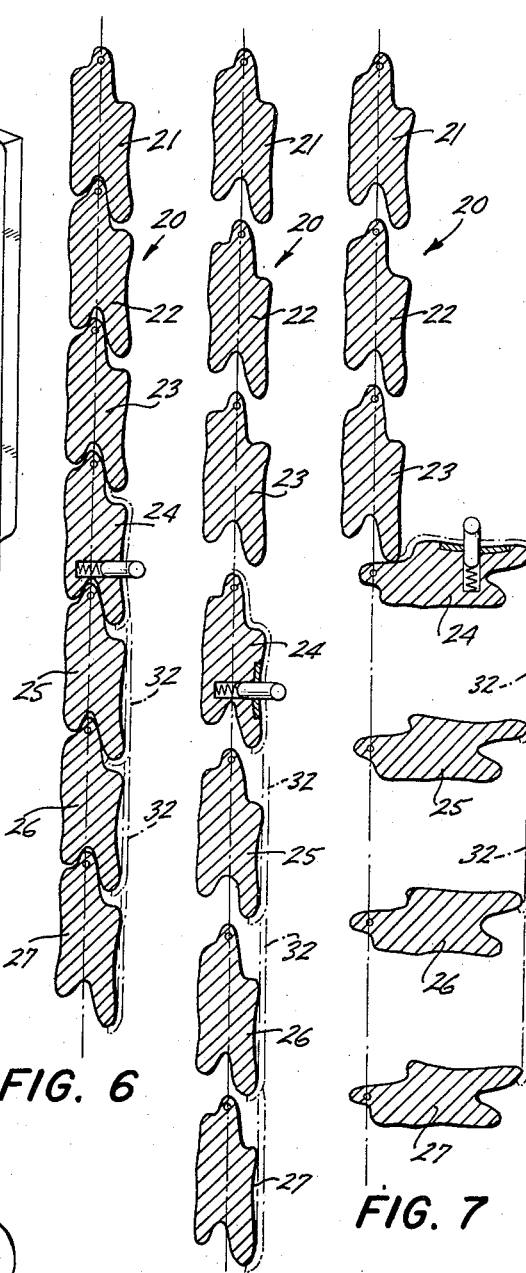
Figs. 5 to 7 are diagrammatic illustrations showing the slats in different positions.

The slots 29' in the links forming the chains 29 will permit movement of the individual slats relative to each other between an open position (Fig. 5) wherein the slats are spaced somewhat apart so as to form a discontinuous sheet and a closed position (Fig. 6) wherein the slats are contiguous to each other and form a substantially continuous sheet, the slats being so shaped, as clearly shown in Fig. 6, as to interfit or dovetail with each other so that when they are in their closed position a weather and light-proof closure is obtained. Additionally, the construction of the links connecting at least a plurality of consecutive slats is such that these slats, indicated at 24, 25, 26, 27, are also pivotally mounted for movement about a longitudinal axis between a flat position wherein each of these slats lies in the plane of the sheet (Figs. 5 and 6) and a tilted position wherein each of these slats forms an angle with this plane (Fig. 7).

By virtue of the above arrangement, the slats will, under the influence of their own weight, normally occupy their open position. However, when movement of any one slat is impeded, unrolling of the remainder of the slats will cause each slat above the arrested slat to move adjacent its next lower slat. Thus, when the bottom slat has reached the bottom of the frame, further unrolling of the blind will cause the slats to be moved to their closed position.

In the illustrated embodiment, all of the tiltable slats 24, 25, 26, 27, are connected to each other in such a manner that at any one instant all of them occupy the same angular position relative to the plane of the sheet of slats. This may be accomplished by providing one or more additional chains 32 whch are attached to each tiltable slat near the bottom edge and adjacent one side free thereof. These chains are constructed in any well known manner so as to permit the tiltable slats, when the same lie flat in the plane of the sheet of slats, to be moved between their open and closed positions. As shown in Fig. 1 the links 32' of the chains 32 are formed at the bottom end thereof with a cutout 50 defining prongs 51 curved around the bottom edge of the respective slat. The top ends of the links are formed with a T-shaped projection having a connecting bar 52 of a width smaller than the width of cutout 50 and a cross bar 53. The opposite ends of cross bars 53 are located between the prongs 50 and the front face of the respective slat. As a result, when the uppermost of the tiltable slats, i.e., the slat 24 hereinafter referred to as the control slat, is tilted, all of the other tiltable slats will assume whatever angular position the control slat assumes.

According to the present invention a pair of channel-shaped guides 40 are provided for guiding the series of connected slats for movement in a frame shown fragmentarily at 41. The stationary component 42 of a suitable positioning means is located at a point along the guides 40 for controlling the angular position which the control slat 24 will occupy during movement of the control slat past this point, the control slat 24 carrying a movable component adapted to cooperate with the stationary component 42. The arrangement of the parts is such that if the control slat is moved continuously in one direction past the stationary component, the control slat and consequently all of the tiltable slats will remain in their flat position, whereas if the control slat is moved past the component 42 a short distance in the opposite direction and is thereafter again moved in the first direction, the control slat and consequently the other tiltable slats will be tilted, and the angle which these slats form with the plane of the sheet of slats will be dependent upon the distance which the tiltable slats are moved in the first direction after having once been moved in the opposite direction a short distance past the component 42. The tiltable slats may be restored to their flat position by moving the control slat in the opposite direction at least a predetermined distance past the component 42.

Thus, in a conventional window or door-type installation, the stationary component of the positioning means is located at a certain point along the height of the window or door frame, and the tiltable slats may be kept flat simply by lowering the control slat past the component 42. If the tiltable slats are to be tilted, this may be accomplished by raising the control slat a short distance past the component 42 and thereafter lowering the slats, the inclination of the tiltable slats being dependent upon the exact distance which the slats are lowered during this step. The slats may then be returned to their flat position by raising the blind.

Figure 4:
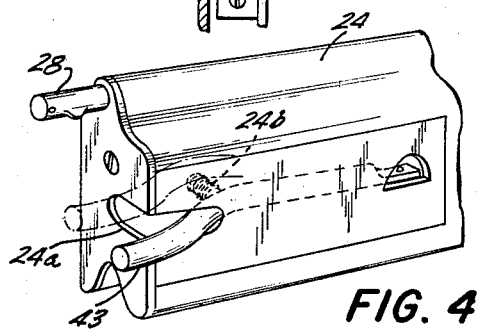
Fig. 4 is a fragmentary perspective view of a control slat according to the present invention.

Fig. 4 shows the control slat 24 as including a tilting element 43 which constitutes the movable component adapted to cooperate with the stationary component 42. The tilting element is formed with a crank portion which extends exteriorly of the slat 24 through an opening 24a, and a spring 24b is provided for continuously urging the tilting element in a direction transverse to the plane of the sheet of slats against a side 44 of the channel-shaped guide 40. The latter is formed with a slot 45 open at this side and is adapted to receive the tilting element 43. Thus, when the control slat 24 is located at a point along the guide 40 where the tilting element is in registration with the opening of the slot 45, the spring 24b will cause the tilting element 43 to project into this slot. At other times, i.e., when the tilting element 43 is out of registration with the opening of the slot 45, the tilting element 43 will be pressed into the slat 24 against the action of the spring 24b.

It will be seen from the above that in the absence of any further structural components the tilting element 43 will, whenever the control slat 24 moves past the slot 45, project into the slot 45. Thus, if the control slat 24 is above the slot 45, lowering of the blind would bring the tilting element into registration with this slot. Once this has occurred, continued lowering of the blind would not simply bring about further lowering of the tiltable slats in their flat position. Instead, the tilting element 43 would penetrate further into the slot, and this, coupled with the lowering of the chain 29 connected to the pins 28, would cause the control slat 24 to assume a tilted position, and the angle of inclination of the control slat, and consequently that of the other tiltable slats, would depend upon the distance which the control slat was lowered after the tilting element 43 had begun its entry into the slot 45.

In order to prevent the control slat 24 from assuming its tilted position every time the blind is lowered, suitable blocking means are provided for blocking the opening of the slot 45. These blocking means comprise a plate 46 arranged in a plane transverse to the plane of the sheet of slats. The plate 46 is formed with a pair of elongated slots 46a which are traversed by a pair of pins 47 for movably mounting the plate. The location of the slots 46a is such that the plate 46 is gravity-biased into a blocking and projecting position wherein the plate covers the opening of the slot 45 and wherein it projects into the path normally traversed by the tilting element 43 during movement of the control slat 24 past the slot 45. If desired, a suitable biasing spring 48 may be provided for continuously urging the plate 46 into this position.

The plate 46 is movable from its blocking and projecting position into an unblocking position in which the plate is spaced from the opening of the slot 45. Additionally, the plate is pivotable about a pivot axis which extends in substantially the same direction as the transverse pivot axes about which the tiltable slats may pivot and is capable of assuming a retracted position wherein the plate is substantially flush with the side 44.

The cooperation between the tilting and blocking elements may best be seen from Figs. 8 to 14.

Figure 8:
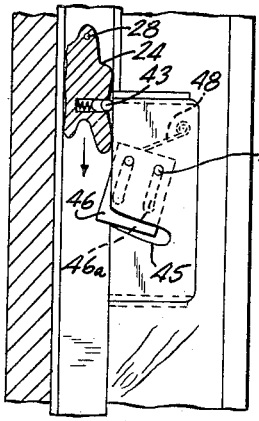
Figs. 8 to 14 diagrammatically illustrate the inter-relation of the control slat with the positioning means at various positions of the control slat.
Figure 9:
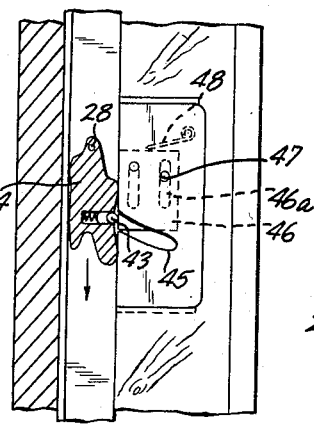
Figure 10:
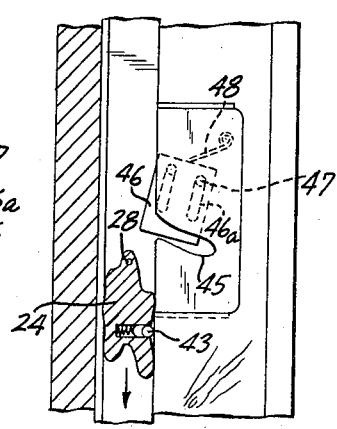

Fig. 8 shows the control slat 24 located above the slot 45. In this position the tilting element 43 is pressed into the slat, and the plate 46 is in its blocking and projecting position. When the blind is lowered, the tilting element 43 engages the plate 46 and cams the same into its retracted position. However, the plate 46 remains in its blocking position so that as the tilting element 43 passes the slot 45 (Fig. 9) it is kept out of the slot 45 by the blocking plate 46. Thus, the blind may be lowered beyond this point to the position shown in Fig. 10, and the control slat 24, and consequently all of the tiltable slats, will remain in their flat position. It will be seen that once the control slat 24 has been moved beyond the blocking element, the latter will pivot back into its projecting position.

Figure 11:
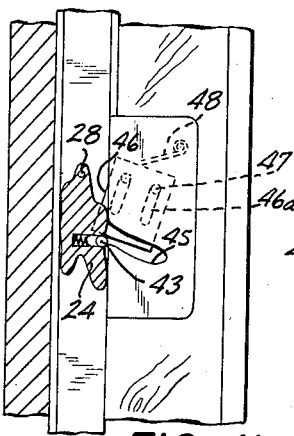
Figure 12:
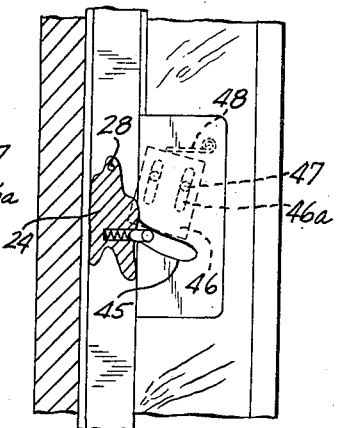
Figure 13:
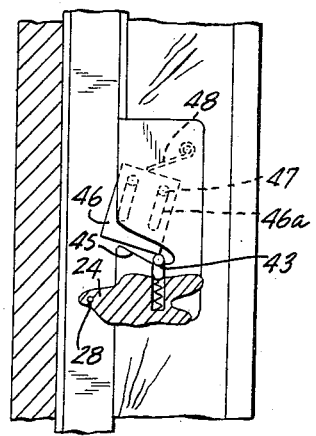
Figure 14:
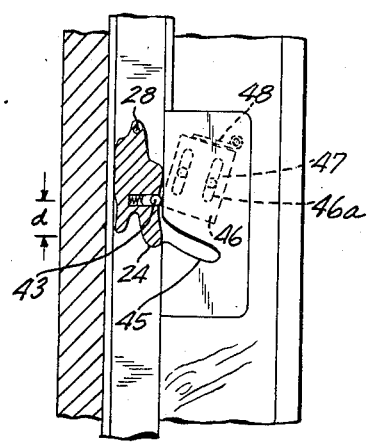

If it is now desired to tilt the tiltable slats, the blind is raised until the tilting element 43 engages the blocking plate 46 (Fig. 11). Upon further upward movement of the control slat 24, the blocking plate 46 will be raised from its blocking position, and as soon as the blocking plate has been lifted sufficiently to permit the entry of the tilting element 43 into the slot 45, the tilting element 43 will be forced into this slot under the action of the spring 24b (Fig. 12). The chain 29 is then lowered, thereby causing the head portion of the control slat 24 carrying the pin 28 to be lowered. However, the bottom portion of the control slat 24 will be guided by the tilting element 43 within the slot 45, so that during continued lowering of the chain 29, the control slat 24, and with it the remaining tiltable slats, will be tilted (Fig. 13). The angle of inclination of the slats may be controlled by the amount which the chain 29 is lowered.

The tiltable slats may then be brought back into their flat portion simply by raising the chain 29. The plate 46 will not hinder the egress of the tilting element 43 from the slot, but will be engaged by the tilting element and be raised thereby. The plate 46 will be continued to be raised until the control slat 24 has been raised a distance indicated by $d$ (Fig. 14) from the position in which the tilting element was in registration with the opening of the slot 45. Once the control slat has been raised this distance, the blocking plate 46 will, due to the arrangement of the slots 46a, have moved back into its retracted position and consequently out of engagement with the tilting element 43. The blocking element 46 will therefore be free to drop back to its blocking and projecting position.

In practice, the slats may be tilted by simply lowering the blind until the control slat 24 occupies the position shown in Fig. 11, thereafter raising the blind the short distance necessary to place the control slat 24 into the position shown in Fig. 12, and thereafter again lowering the blind a distance sufficient to obtain the desired inclination of the tiltable slats. It is, of course, also possible to raise the blind from a position wherein the control slat 24 is below the slot 45 without tilting the tiltable slats. This can be accomplished simply by raising the blind past the slot 45. It should be noted, however, that in the event the blind was first lowered to a point wherein the control slat 24 was below the slot and is then raised to a point wherein the tilting element 43 occupies a position intermediate the slot 45 and the point spaced the distance $d$ above it, one should, if at that time it is desired to lower the blind to a point at which the slat 24 is below the slot 45 without simultaneously tilting the tiltable slats, first raise the blind to a point at which the tilting element 43 is above the slot 45 a distance which is greater than $d$. If this were not done, the blocking plate 46 would not be free to assume its blocking position and lowering of the blind would, under these circumstances, also cause tilting of the tiltable slats.

It will be understood that each of the elements described above, or two or more together, may also find a useful application in other types of blinds differing from the types described above.

While the invention has been illustrated and described as embodied in a blind arrangement wherein only some of the slats are tiltable, it is not intended to be limited to the details shown, since various modifications and structural changes may be made without departing in any way from the spirit of the present invention. For example, the blind may be one in which all of the slats are tiltable.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a blind arrangement, in combination, an elongated slat means movable in a plane and tiltable about a longitudinal axis parallel to said plane between a flat position in which said slat means extends substantially in said plane and a tilted position in which said slat means includes an angle with said plane, said elongated slat means adapted to be connected to a plurality of other elongated slat means movable therewith in said plane and tiltable therewith about a plurality of axes, substantially parallel to said longitudinal axis, respectively; a tiltable member mounted at one end thereof on said one elongated slat means and having a free end continuously urged in a direction transverse to said plane beyond a side face of said one slat means; a stationary member located along the path of movement of said one slat means and being formed with a slot extending transverse to said plane and opening toward a face of said stationary member directed toward said side face of said one slat means; and blocking means mounted on said stationary member and having a portion projecting into the path of movement of said free end of said tiltable member, said blocking means being continuously urged to a blocking position for preventing said free end of said tiltable member to enter said slot during movement of said tiltable member past said slot in one direction and said blocking means being movable to an unblocking position by engagement of said projecting portion thereof by said free end of said tiltable member during movement of the latter through said stationary member in a direction opposite to said one direction so that said free end of said tiltable member will enter said slot during movement of said tiltable member past said slot in said opposite direction, whereby said slat means will be tilted when said one slat means is moved again in said one direction after the free end of said tiltable member has entered the slot.

2. In a blind arrangement, in combination, a series of parallel slats adapted to cooperate with each other to form a sheet; means interconnecting said slats and mounting the same for pivotal movement about longitudinal axes, respectively, between a flat position in which said slats extend in a plane of said sheet and a tilted position in which each slat includes an angle of said plane; connecting means connecting said slats at points spaced from said axes thereof for simultaneous tilting movement about said axes; elongated channel-shaped guide means for guiding said series of connected slats for movement in a plane; and positioning means comprising a tiltable member mounted on one end thereof on one of said slats and having a free end continuously urged in a direction transverse to said plane of said sheet of slats against one side face of said channel-shaped guide means, a stationary member fixedly mounted on said guide means and being formed with a slot extending transverse to said plane and open toward said one side face of said guide means, and blocking means mounted on said stationary member and having a portion projecting into the path of movement of said free end of said tiltable member, said blocking means being continuously urged to a blocking position for preventing said free end of said tiltable member to enter said slot during movement of said tiltable member past said slot in one direction and said blocking means being movable to an unblocking position by engagement of said projecting portion thereof by said free end of said tiltable member during movement of the latter through said stationary member in a direction opposite to said one direction so that said free end of said tiltable member will enter said slot during movement of said tiltable member past said slot in said opposite direction, whereby said slats will be tilted when said one slat is moved again in said one direction after the free end of said tiltable member has entered the slot.

3. The combination defined in claim 2 wherein said blocking means comprise a blocking element mounted in the region of the opening of said slot for sliding movement in the direction of said channel-shaped guide means between a blocking position wherein said blocking element covers said opening of said slot and an unblocking position wherein said blocking element is spaced from said opening and for pivotal movement about a pivot axis extending in the same direction as the pivot axes about which said tiltable slats may pivot between a retracted position wherein said blocking element is substantially flush with said side face and a projecting position wherein a portion of said blocking element adjacent said slot projects beyond said one side face of said guide means into the path normally traversed by said tilting element during movement of said one tiltable slat past said stationary component, said blocking element being continuously yieldably urged toward its blocking and projecting position.

4. The combination defined in claim 3 wherein said slot is inclined to said channel-shaped guide means and forms an acute angle with said one direction.

5. The combination defined in claim 3 wherein said blocking element is a plate arranged in a plane transverse to the plane of said sheet of slats.

6. The combination defined in claim 5 wherein said plate is formed with a pair of elongated slots extending in the direction of said channel-shaped guide means, and a pair of stationary pins extending through said slots, respectively, for movably mounting said plate.

7. The combination defined in claim 6, and first spring means operatively associated with said tilting member for continuously urging the same in said transverse direction and second spring means operatively associated with said blocking element for continuously urging the same into said blocking and projecting position.

References Cited in the file of this patent

UNITED STATES PATENTS

| 96,014 | Knevitt | Oct. 19, 1869 |
| 1,912,817 | Bauer | June 6, 1933 |

OTHER REFERENCES

| 21,501 | Germany | July 22, 1882 |
| 27,821 | Germany | July 9, 1884 |
| 1,043,890 | France | June 17, 1953 |
| 1,076,329 | France | Apr. 21, 1954 |